(12) United States Patent
Ko et al.

(10) Patent No.: US 9,621,505 B1
(45) Date of Patent: Apr. 11, 2017

(54) PROVIDING IMAGES WITH NOTIFICATIONS

(71) Applicant: Google Inc., Mountain View, CA (US)

(72) Inventors: Kathleen Ko, San Francisco, CA (US); Priscilla Dao Pham, San Francisco, CA (US); Alison Boncha, San Francisco, CA (US); Marcus Lowe, Boston, MA (US); Lauren Stephens, Indianapolis, IN (US)

(73) Assignee: Google Inc., Mountain View, CA (US)

( * ) Notice: Subject to any disclaimer, the term of this patent is extended or adjusted under 35 U.S.C. 154(b) by 328 days.

(21) Appl. No.: 13/947,048

(22) Filed: Jul. 20, 2013

(51) Int. Cl.
*H04L 12/58* (2006.01)

(52) U.S. Cl.
CPC .... *H04L 51/32* (2013.01); *G06T 2207/20132* (2013.01)

(58) Field of Classification Search
CPC ............. H04L 51/32; G06T 2207/20132
See application file for complete search history.

(56) References Cited

U.S. PATENT DOCUMENTS

| | | | | |
|---|---|---|---|---|
| 2009/0192921 A1* | 7/2009 | Hicks | ................... | G06F 3/0312 705/28 |
| 2009/0208118 A1* | 8/2009 | Csurka | ............... | G06K 9/00664 382/228 |
| 2009/0324022 A1* | 12/2009 | Sangberg | .......... | G06F 17/30265 382/118 |
| 2013/0013683 A1* | 1/2013 | Elliott | .................... | G06Q 50/01 709/204 |
| 2013/0039579 A1* | 2/2013 | Ahn | ........................ | G06T 11/60 382/190 |
| 2013/0147845 A1* | 6/2013 | Xie | .......................... | G06F 3/14 345/660 |
| 2013/0262588 A1* | 10/2013 | Barak | ..................... | H04L 67/22 709/204 |
| 2013/0330019 A1* | 12/2013 | Kim | ........................ | G06T 11/60 382/298 |
| 2014/0279068 A1* | 9/2014 | Systrom | ............. | G06Q 30/0277 705/14.73 |

\* cited by examiner

*Primary Examiner* — Brian J Gillis
*Assistant Examiner* — Gil H. Lee
(74) *Attorney, Agent, or Firm* — IP Spring

(57) ABSTRACT

Implementations generally relate to providing images with notifications. In some implementations, a method includes generating a notification to a target user in a social network system. The method also includes selecting one or more of the images associated with the notification based on one or more predefined selection criteria. The method also includes cropping one or more of the selected images based on one or more predefined cropping criteria. The method also includes causing the cropped images to be displayed with the notification.

20 Claims, 7 Drawing Sheets

400

600

PROVIDING IMAGES WITH NOTIFICATIONS

BACKGROUND

Social network systems often enable users to share photos with each other. For example, users can share photos with friends and family, which provides enjoyable and bonding experiences among users of social network systems. Social network systems also enable users to tag photos such that people in photos are labeled with their respective names. Some social network systems send users notifications with appropriate text indicating to users if they have been tagged in a photo.

SUMMARY

Implementations generally relate to providing images with notifications. In some implementations, a method includes generating a notification to a target user in a social network system. The method also includes selecting one or more of images associated with the notification based on one or more predefined selection criteria. The method also includes cropping one or more of the selected images based on one or more predefined cropping criteria. The method also includes causing the cropped images to be displayed with the notification.

With further regard to the method, in some implementations, the notification notifies the target user that the target user has been tagged in the one or more images. In some implementations, the predefined selection criteria include a relevancy of an image to the target user. In some implementations, the predefined selection criteria include a determination that the target user is in an image. In some implementations, the predefined selection criteria include a determination that the target user is tagged in an image. In some implementations, the selecting of the one or more of the images includes: obtaining the one or more images; ranking the images based on the one or more predefined selection criteria; and selecting one or more of the images based on the ranking. In some implementations, the selecting of the one or more of the images includes: obtaining the one or more images; ranking the images based the on one or more predefined selection criteria, where the predefined selection criteria includes social affinity criteria; and selecting one or more of the images based on the ranking. In some implementations, the cropping criteria include a relevancy of each cropped section to the target user. In some implementations, the cropped images are displayed in an initial view of the notification.

In some implementations, a method includes generating a notification to a target user in a social network system, where the notification notifies the target user that the target user has been tagged in one or more photos. The method also includes selecting one or more of the photos associated with the notification based on one or more predefined selection criteria, where the predefined selection criteria includes a relevancy of a photo to the target user, where the selecting of the one or more of the photos includes: obtaining the one or more photos; ranking the photos based on the one or more predefined selection criteria; and selecting one or more of the photos based on the ranking. The method also includes cropping one or more of the selected photos based on one or more predefined cropping criteria. The method also includes causing the cropped photos to be displayed with the notification.

With further regard to the method, in some implementations, the predefined selection criteria include a determination that the target user is tagged in a photo. In some implementations, the predefined selection criteria include social affinity criteria. In some implementations, the cropped photos are displayed in an initial view of the notification.

In some implementations, a system includes one or more processors, and logic encoded in one or more tangible media for execution by the one or more processors. When executed, the logic is operable to perform operations including: one or more processors; and generating a notification to a target user in a social network system; selecting one or more images associated with the notification based on one or more predefined selection criteria; cropping one or more of the selected images based on one or more predefined cropping criteria; and causing the cropped images to be displayed with the notification.

With further regard to the system, in some implementations, the notification notifies the target user that the target user has been tagged in the one or more images. In some implementations, the predefined selection criteria may include a degree of relevancy of an image to the target user. In some implementations, the predefined selection criteria include a determination that the target user is in an image. In some implementations, the predefined selection criteria include a determination that the target user is tagged in an image. In some implementations, to select the one or more of the images, the logic when executed is further operable to perform operations including: obtaining the one or more images; ranking the images based on the one or more predefined selection criteria; and selecting one or more of the images based on the ranking. In some implementations, to select the one or more of the images, the logic when executed is further operable to perform operations including: obtaining the one or more images; ranking the images based on the one or more predefined selection criteria, where the predefined selection criteria includes social affinity criteria; and selecting one or more of the images based on the ranking.

Some implementations may provide various advantages. For example, when the user views the user's notifications window, the user views the most relevant images with notifications, and also views the most relevant portions of each image. Furthermore, the system displays a large number of relevant images using minimal screen real estate, where the user can quickly visually scan the images.

DETAILED DESCRIPTION

Implementations described herein provide images with notifications in a social network system. In various implementations, a system generates a notification to a target user in a social network system, where the notification notifies the target user that the target user has been tagged in one or more images. The system then selects one or more of the images associated with the notification based on one or more predefined selection criteria. In some implementations, the predefined selection criteria include the relevancy of an image to the target user. In some implementations, the predefined selection criteria may include a determination that the target user is tagged in an image. In some implementations, to select one or more of the images, the system obtains one or more images, ranks the images based on the one or more predefined selection criteria, and then selects one or more of the images based on the ranking. In some implementations, the predefined selection criteria include social affinity criteria. The system then crops one or more of the selected images based on one or more predefined cropping criteria. The system then causes the cropped images to be displayed with the notification. In some implementations, the system causes the cropped images to be displayed in an initial view of the notification.

Accordingly, when the user views the user's notifications window, the user views the most relevant images with notifications (e.g., images in which the user has been tagged), and also views the most relevant portions of each image. Furthermore, the system displays a large number of relevant images using minimal screen real estate, where the user can quickly visually scan the images.

Figure 1:
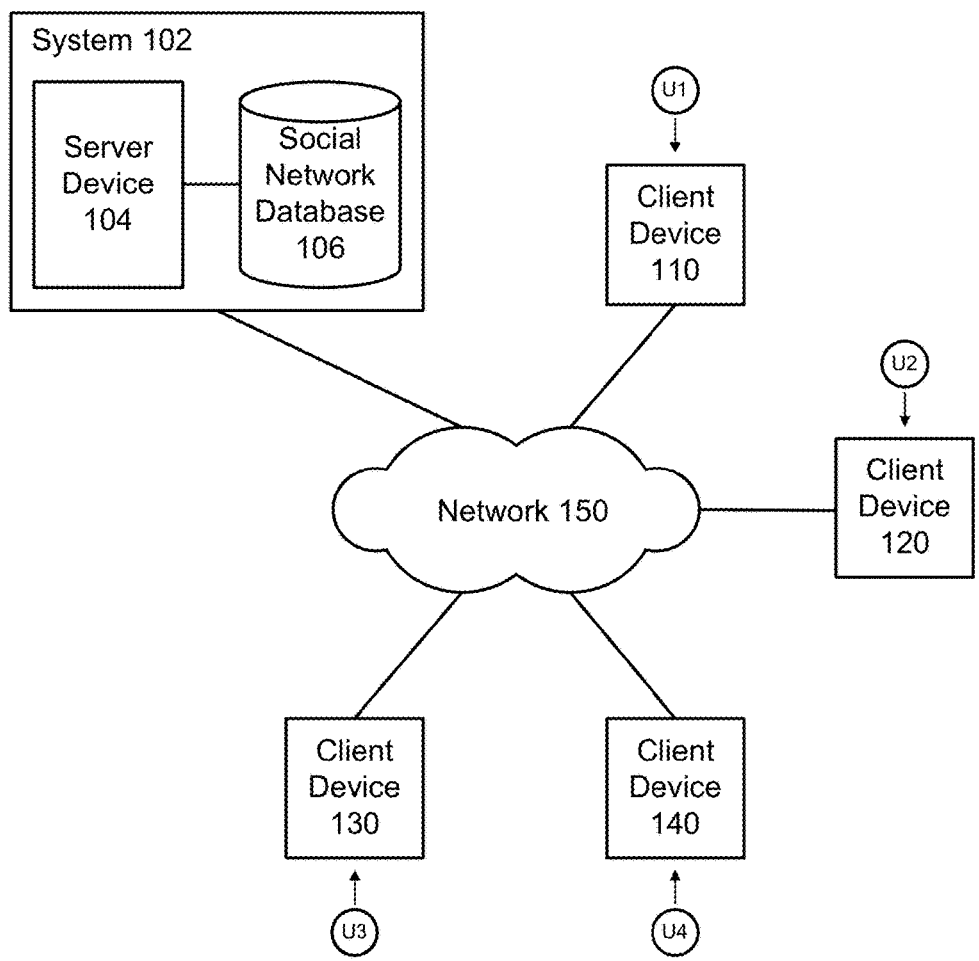
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may share images with each other, where respective client devices 110, 120, 130, and 140 transmit images and other media items to each other.

Figure 2:
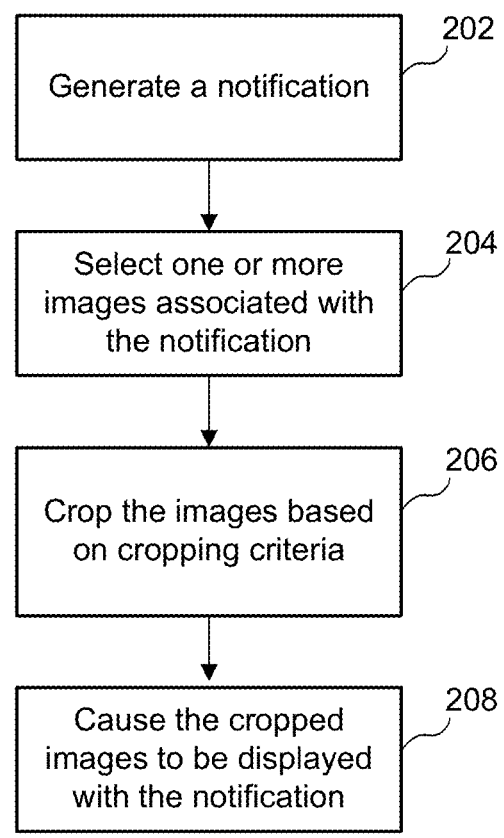
FIG. 2 illustrates an example simplified flow diagram for providing images with notifications, according to some implementations.

FIG. 2 illustrates an example simplified flow diagram for providing images with notifications, according to some implementations. Referring to both FIGS. 1 and 2, a method is initiated in block 202, where system 102 generates a notification to a target user in a social network system.

In various implementations, the notification may provide the target user with a variety of types of notifications. For example, in various implementations, the notification may notify the target user that one or more images associated with the target user has been tagged. In some implementations, the notification may notify the target user that the target user has been tagged in one or more images, where the one or more images may be owned by the target user, or may be owned by another user.

In some implementations, the notification may notify the target user that an image has been tagged that is owned by the target user, where another person other than the target user is tagged or commented on. In some implementations, the notification may notify the target user that one or more images has comments, where the comments refer to the target user, and where the one or more images may be owned by the target user or may be owned by another user. In some implementations, the notification may notify the target user of images, where a tag of the target user or a comment referring to the target user is removed.

In some implementations, the notification may notify the target user that one or more images owned by the target user have been automatically uploaded to the social network system.

In block 204, system 102 selects one or more of the images associated with the notification based on one or more predefined selection criteria. In various implementations described herein, system 102 implements the one or more selection criteria to select images that would most likely be the most interesting to the target user. In various implementations, system 102 uses the predefined selection criteria to select images, where the image may have varying degrees of relevancy of an image to the target user. For example, in some implementations, the predefined selection criteria include a determination that the target user is in an image. In some implementations, the predetermined selection criteria include a determination that the target user is tagged in an image. In various implementations, system 102 may determine a relevancy score for each image based on various relevancy factors (e.g., the presence of the target user in a given image, whether the person who took a given photo of the target user is socially connected to the target user, etc.). Example implementations directed to relevancy factors and other factors are described in more detail below. Note that the term photo is used to describe an image that is captured with a camera device. An image is a collection of pixels, which may be generated in a photo or may be generated outside the context of a photo (e.g., using an illustration tool, etc.). Implementations described herein apply to photos and images, depending on the particular implementation.

In various implementations, the predefined selection criteria may include whether the target user attended an event associated with photos that another user has captured at the event. In some implementations, system 102 may determine that the target user attended the event based on various factors. For example, system 102 may determine that the target user has attended the event if the user has checked in at the event. System 102 may also determine that the target user has attended the event by determining that the target user is in a photo taken at the event and/or tagged in an image in a photo taken at the event. System 102 may also confirm that the target user was expected at the event (e.g., as an invitee). In various implementations, system 102 may determine a relevancy score for each image based on any combination of the target user being in a given image, the image being associated with a particular event, the target user being an invitee and/or attendee at the event, etc.).

In various implementations, the predefined selection criteria may include social affinity criteria. For example, the social affinity criteria may include whether a friend or family member of the target user is in a given image with the target user. System 102 may determine the target user and other people in a given image using any suitable facial recognition algorithm. Implementations associated with various facial recognition algorithms are described in more detail below. System 102 may determine whether other people in the image are friends or family members of target user based on the social graph of the target user. In various implementations, system 102 may determine a relevancy score for each image based on any combination of the target user socially connected to the person who owns the image (e.g., took the photos with the image, etc.), the degree of social connection (e.g., friends, family, etc.) between the target user and the image owner, etc.

In various implementations, the predefined selection criteria may include image quality criteria. In various implementations, system 102 may determine an image quality score for each image based on various image quality attributes (e.g., clearness, resolution, brightness, contrast, etc.).

In various implementations, the predefined selection criteria may include image space allotment criteria. In various implementations, system 102 may determine an amount of allotted space for a given notification. For each image, system 102 may determine modification and cropping potential if each image in relation to the amount of allotted space. For example, in some implementations, system 102 may determine if an object (e.g., face of the target user) in a given image can be adjusted in size and cropped such that the object is clearly visible in the notification. For instance, close-up image of the target user may be more suitable for re-sizing and cropping than a distant view of the target user in crowd of people. In some implementations, system 102 may determine a space suitability score for each image based on the content of the image, the space allocation in the notification, etc.

In some implementations, to select one or more of the images, system 102 obtains the one or more images associated with notification. System 102 then ranks the images based on the one or more predefined selection criteria. For example, system 102 may rank the images based on scores associated with relevance (e.g., relevance, social affinity, image quality, space allotment, etc.). System 102 then selects one or more of the images based on the ranking. For example, system 102 may select the highest ranking images.

In block 206, system 102 crops one or more of the selected images based on one or more predefined cropping criteria. In various implementations, system 102 may locate objects in each image in order to isolate and crop such objects.

In some implementations, before cropping the selected images, system 102 may determine how much space to allot to each image. System 102 may then intelligently crop the selected images accordingly based on the one or more predefined cropping criteria, and based on filling the allotted space.

In some implementations, system 102 reads tagged image data in order to determine the bounding box of the face of the person being tagged. For example, the tagged image data may include, for example, facial coordinates and/or other object coordinates to facilitate system 102 in determining the bounding box. In some implementations, system 102 may use a facial recognition algorithm to determining the bounding box. Example implementations related to facial recognition are described in more detail below.

In some implementations, the cropping criteria may include the relevancy of each cropped section to the target user. For example, system 102 may use cropping criteria crop the images in order to show the most relevant section of each image, such as the face of the target user, etc. If a user receives a notification that the user has been tagged in an album for a previous event (e.g., last week's barbeque), the user will see the notification right away when checking notifications of the images which are cropped to the user's face.

In some implementations, system 102 may crop a given image such that two or more discrete objects (e.g., the target user's face, a monument, etc.) are cropped into separate images and then combined into one. This may be done in order to minimize empty space in the resulting image. This may be preferable, because more of the allotted space is filled with interesting visual information instead of empty space.

In some implementations, system 102 may resize (e.g., reduce/shrink, enlarge, etc.) the size of one or more given images to a particular height (e.g., to fit an allocated space) and keep the same aspect ratio in order to optimize the images to best fit into an allotted space.

In some implementations, system 102 may modify the aspect ratio of one or more given images in order to optimize the images to best fit into an allotted space.

In block 208, system 102 causes the cropped images to be displayed with the notification. In various implementations, the cropped images are displayed in an initial view of the notification (e.g., in a notifications section). In some implementations, system 102 may order the displayed images based on their rankings. For example, system 102 may cause the highest ranking images to be positioned on the far left of a group of displayed images. System may cause the second highest image to be positioned in the second position from the left of the group of displayed images.

Figure 3:
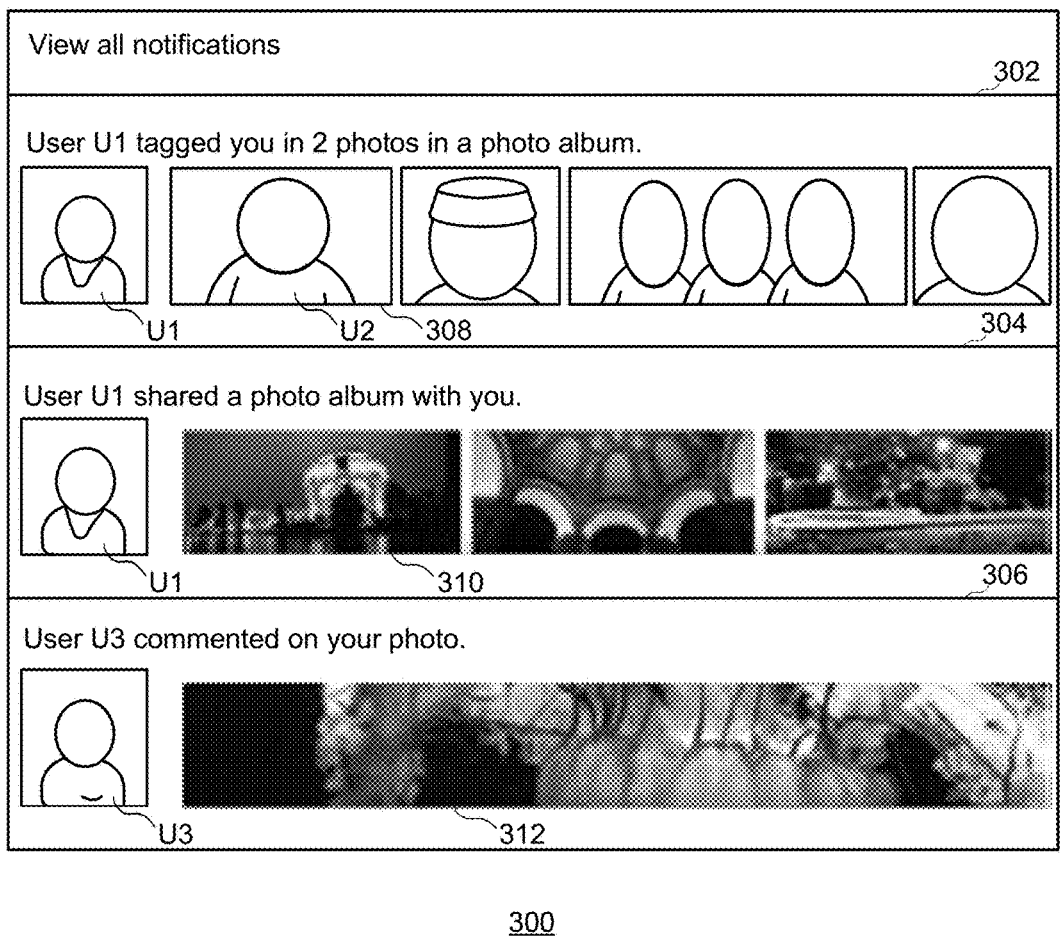
FIG. 3 illustrates an example simplified user interface, according to some implementations.

FIG. 3 illustrates an example simplified user interface 300, according to some implementations. FIG. 3 shows notifications 302, 304, and 306. Notification 302 indicates that a user U1 tagged the target user in a photo album. In various implementations, system 102 show a cropped preview 308 of an image of the target user (e.g., user U2), as well as cropped previews of other images in the photo album that might be of interest to the target user.

Notification 304 indicates that user U1 shared a photo album with the target user. In some implementations, system 102 may also show various cropped previews such as preview 310, which may be of interest to the target user.

Notification 306 indicates that a user U3 commented on an image of the target user. Notification 306 shows a preview 312 of the image commented on.

The resulting notification provides the target user with a visual indication as to which images have received an action (e.g., images have been tagged, commented on, etc.). Similarly, the user is able to identify the other user(s) performing actions on images. Such implementations establish a stronger connection between the user's images and actions that have occurred.

In some implementations, system 102 determines an order in which the images will appear to the user. In some implementations, system 102 causes images most relevant to the user to be displayed first in the initial view of a notification.

In some implementations, in the case where a face is not found, system 102 may use smart crop data provided by an image service and displays the most relevant crop of the image.

In some implementations system 102 may generate notifications that refer to a group of images (e.g., an album of photos).

In some implementations, in response to the target user selecting (e.g., clicking on) a notification, system 102 may expand the notification to a detailed view. The detailed view may display details and show one or more images associated with the notification. Such details may include text accompanying a given image, such as the text shown in FIG. 3. Such text may vary depending on the particular implementations. For example, the notification text may include: "Someone added a tag in a photo you own," "Someone tagged your face in a photo," "Someone tagged your face in multiple photos," "Someone commented on a photo that you were tagged in," "Someone commented on/mentioned a photo/post that you were tagged in," "Many of your photos were automatically uploaded from your camera," etc. An example implementation of a detailed view is shown below in connection with FIG. 5.

In various implementations, system 102 causes one or more of the images associated with a given notification to be displayed in the preview. If there is not sufficient space, system 102 may display the highest ranking images in accordance with implementations described herein.

In various implementations, the previews may provide sufficient information for the target user to understand the nature of the notification. For example, if the user sees his or her image in the preview, the user may quickly understand that the notification shows that he or she was tagged. As such, the target user may not feel the need to select the notification in order to see the details. In other words, implementations may reduce the number of times that a given target user selects (e.g., clicks) notifications.

In some implementations, system 102 may still provide some notifications with text or without particular images (e.g., if an image associated with a notification is deleted, too small, and/or if a tag is removed, etc.).

As shown in FIG. 3, the different previews show images cropped in various ways, which will be described in more detail below in connection with FIGS. 4, 5, and 6.

Figure 4:
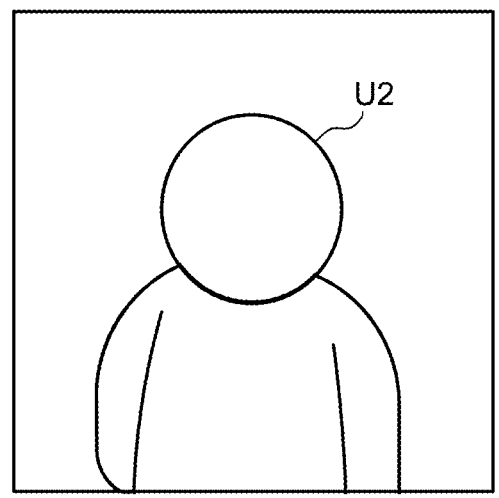
FIG. 4 illustrates an example simplified image, according to some implementations.

FIG. 4 illustrates an example simplified image 400, according to some implementations. Image 400 is an image of the target user U2. Comparing image 400 to preview 308 of FIG. 3, system 102 has cropped image 400 in preview 308 to better frame and emphasize the face, which is the most interesting portion of the image.

Figure 5:
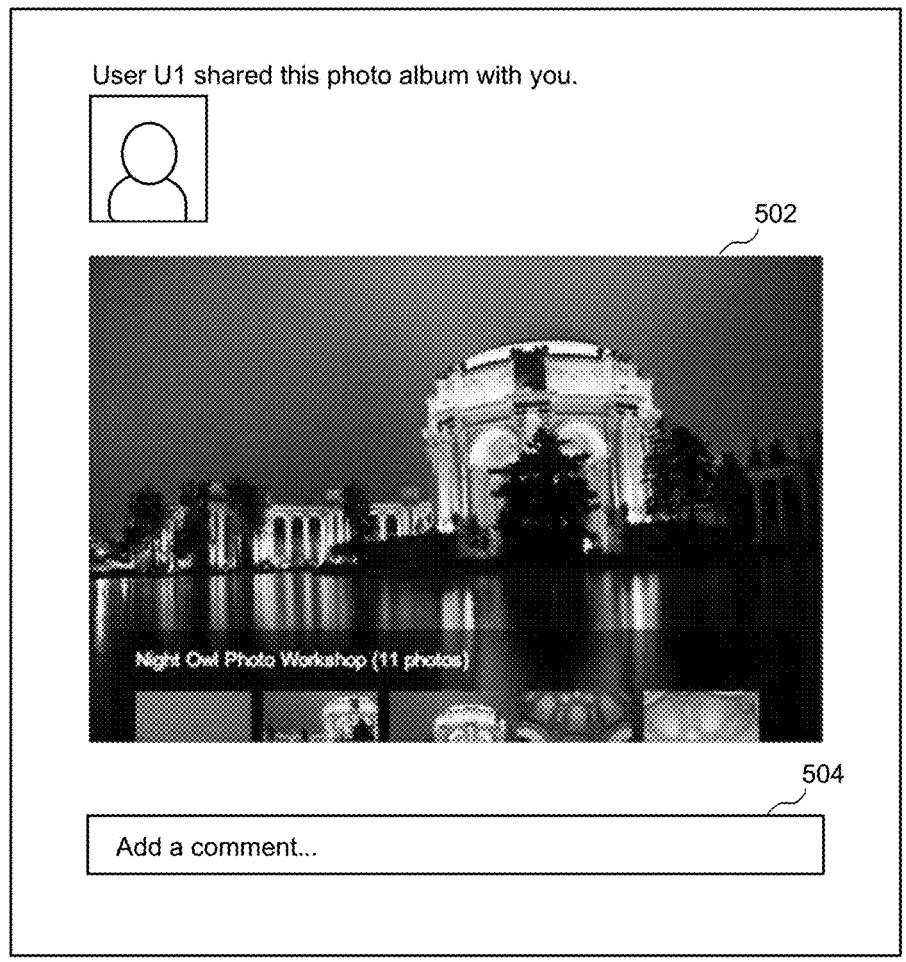
FIG. 5 illustrates an example simplified detailed view of a notification, according to some implementations.

FIG. 5 illustrates an example simplified detailed view 500 of a notification, according to some implementations. Detailed view 500 includes an image 502 that corresponds to preview 310 of FIG. 3. Detailed view 500 also includes a comment box 504. Comment box 504 provides a convenient way to comment directly on a notification encourages target user feedback which may be helpful to system 102 in more accurately ranking other images associated with the target user.

Figure 6:
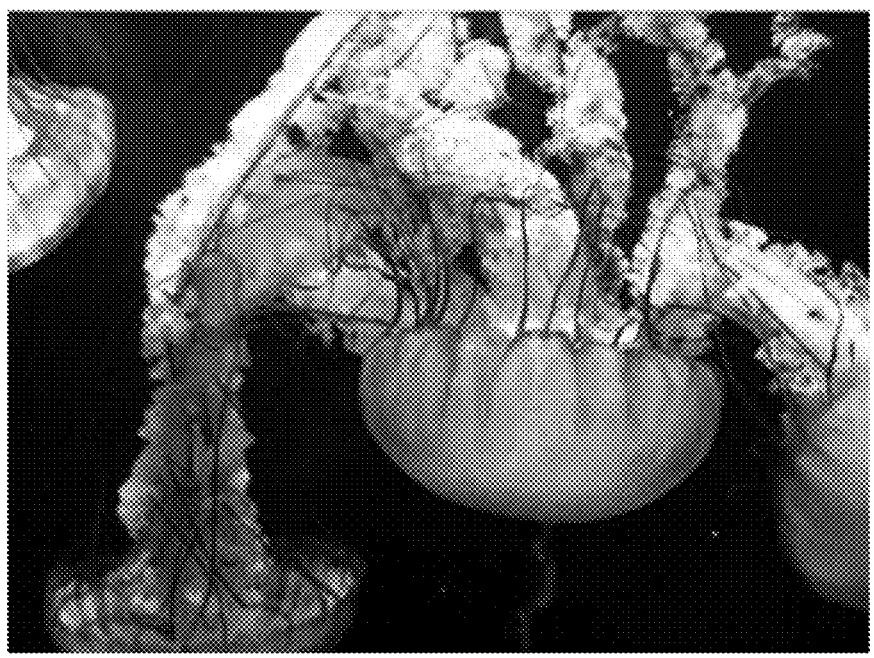
FIG. 6 illustrates an example image, according to some implementations.

FIG. 6 illustrates an example image 600, according to some implementations. Comparing image 600 to preview 312 of FIG. 3, system 102 has cropped image 600 in preview 312 to better show a portion the item in image 600 in order to make preview 312 more interesting, as well as to better fill the allotted space.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in images. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include system 102 using their faces in images or using their identity information in recognizing people identified in images. For example, system 102 may provide users with multiple selections directed to specifying and/or consenting to the use of personal information. For example, selections with regard to specifying and/or consenting may be associated with individual images, all images, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their images for facial recognition in general. Example implementations for recognizing faces and other objects are described in more detail below.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in an image, system 102 may compare the face (e.g., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the image. In some implementations, for a given reference image, system 102 may extract features from the image of the face in an image for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the image to one more reference images with matching or similar features. In some implementations, system 102 may normalize multiple reference images, and compress face data from those images into a composite representation having information (e.g., facial feature data), and then compare the face in the image to the composite representation for facial recognition.

In some scenarios, the face in the image may be similar to multiple reference images associated with the same user. As such, there would be a high probability that the person associated with the face in the image is the same person associated with the reference images.

In some scenarios, the face in the image may be similar to multiple reference images associated with different users. As such, there would be a moderately high yet decreased probability that the person in the image matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the image to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the image matches a given reference image. In some implementations, the output may be represented as a metric (or numerical value) such as a percentage associated with the confidence that the face in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

Implementations described herein provide various benefits. For example, when the user views the user's notifications window, the user views the most relevant images with notifications (e.g., that the user has been tagged), and also views the most relevant portions of each image. Furthermore, implementations display a large number of relevant images using minimal screen real estate, where the user can quickly visually scan the images.

Figure 7:
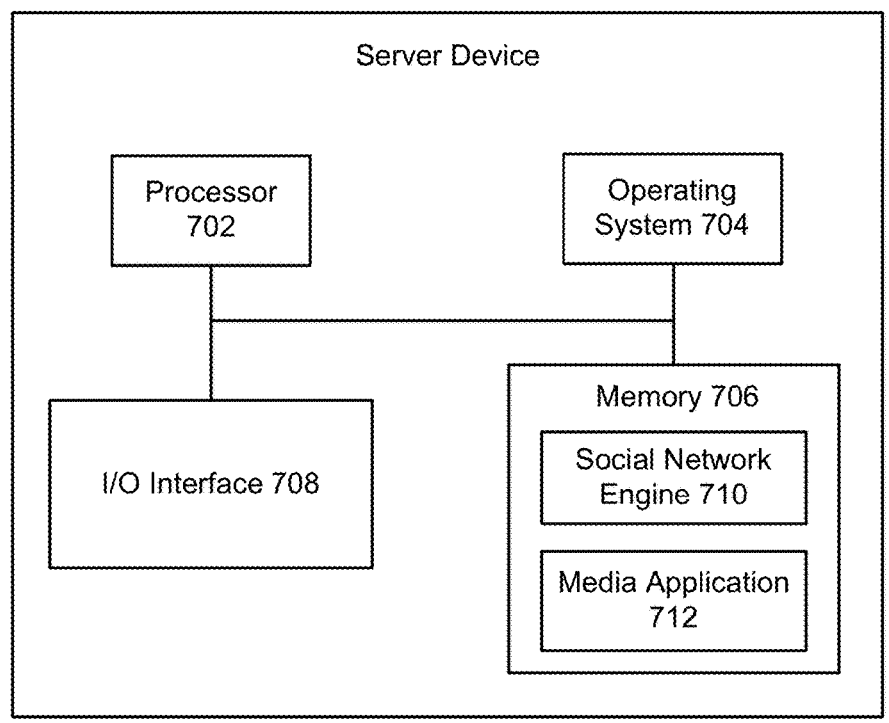
FIG. 7 illustrates a block diagram of an example server device, which may be used to implement the implementations described herein.

FIG. 7 illustrates a block diagram of an example server device 700, which may be used to implement the implementations described herein. For example, server device 700 may be used to implement server device 104 of FIG. 1, as well as to perform the method implementations described herein. In some implementations, server device 700 includes a processor 702, an operating system 704, a memory 706, and an input/output (I/O) interface 708. Server device 700 also includes a social network engine 710 and a media application 712, which may be stored in memory 706 or on any other suitable storage location or computer-readable medium. Media application 712 provides instructions that enable processor 702 to perform the functions described herein and other functions.

For ease of illustration, FIG. 7 shows one block for each of processor 702, operating system 704, memory 706, I/O interface 708, social network engine 710, and media application 712. These blocks 702, 704, 706, 708, 710, and 712 may represent multiple processors, operating systems, memories, I/O interfaces, social network engines, and media applications. In other implementations, server device 700 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:
generating a notification to a target user in a social network system, wherein the notification notifies the target user that the target user has been tagged in photos;
performing object recognition on the photos, the object recognition including an identification of a face corresponding to the target user that was tagged in the photos and a landmark;
determining that the target user attended an event associated with the photos;
selecting the photos associated with the notification based on one or more predefined selection criteria, wherein the predefined selection criteria include photo quality and a first relevancy of the photos to the target user based on the object recognition and the target user attending the event associated with the photos, wherein the selecting the photos comprises:
obtaining the photos;
ranking the photos based on the one or more predefined selection criteria; and
selecting the photos based on the ranking;
cropping one or more of the selected photos based on one or more predefined cropping criteria including the identification of the face corresponding to the target user and the landmark, wherein the cropping includes cropping a first photo from the selected photos into a first cropped photo of the face and cropping a second photo from the selected photos into a second cropped photo of the landmark;
combining the first cropped photo and the second cropped photo into a combined photo; and
causing the combined photo to be displayed with the notification and a visual indication that the combined photo is associated with one or more actions, wherein the one or more actions include that the combined photo was commented on.

2. The method of claim 1, wherein the predefined selection criteria further include one or more actions associated with each of the photos.

3. The method of claim 1, wherein the predefined selection criteria further include social affinity criteria.

4. The method of claim 1, wherein the combined photo is displayed in an initial view of the notification.

5. The method of claim 1, wherein the first photo and the second photo are a same photo.

6. The method of claim 1, wherein the predefined selection criteria further include a second relevancy of each photo to the target user based on at least one of the target user being in each photo, each photo being associated with the event, the target user being an invitee to the event, and the target user being an attendee to the event.

7. The method of claim 1, wherein the predefined selection criteria further include a determination that the target user is in one or more of the photos.

8. A system comprising:
one or more processors; and
logic encoded in one or more tangible media for execution by the one or more processors and when executed operable to perform operations comprising:
generating a notification to a target user in a social network system to notify the target user that the target user was tagged in images;
performing object recognition on the images, the object recognition including an identification of a face corresponding to the target user that was tagged in the images and a landmark;
determining that the target user attended an event associated with the images;
selecting the images associated with the notification based on one or more predefined selection criteria, wherein the predefined selection criteria include image quality and a first relevancy of the images to the target user based on the object recognition and the target user attending the event associated with the images, wherein the selecting the images comprises:
obtaining the images;
ranking the images based on the one or more predefined selection criteria; and
selecting the images based on the ranking;
cropping one or more of the selected images based on one or more predefined cropping criteria including the identification of the face corresponding to the target user and the landmark, wherein the cropping includes cropping a first image from the selected images into a first cropped image of the face and cropping a second image from the selected images into a second cropped image of the landmark;
combining the first cropped image and the second cropped image into a combined image; and
causing the combined image to be displayed with the notification and a visual indication that the combined image is associated with one or more actions, wherein the one or more actions include that the combined image was commented on.

9. The system of claim 8, wherein the first image and the second image are a same image.

10. The system of claim 8, wherein the predefined selection criteria further include a second relevancy of each image to the target user based on at least one of the target user being in each image, each image being associated with the event, the target user being an invitee to the event, and the target user being an attendee to the event.

11. The system of claim 8, wherein the predefined selection criteria further include a determination that the target user is in one or more of the images.

12. The system of claim 8, wherein the predefined selection criteria further include a determination that the target user is tagged in one or more of the images.

13. The system of claim 8, wherein the one or more predefined selection criteria further includes space allotment.

14. The system of claim 8, wherein, selecting the images comprises selecting the images and:
obtaining the images;
ranking the images based on the one or more predefined selection criteria, wherein the predefined selection criteria further include social affinity criteria; and
selecting the images based on the ranking.

15. A non-transitory computer readable medium with instructions that, when executed by one or more computers, cause the one or more computers to perform operations, the operations comprising:
generating a notification to a target user in a social network system to notify the target user that the target user was tagged in images;
performing object recognition on the images, the object recognition including an identification of a face corresponding to the target user that was tagged in the images and a landmark;

determining that the target user attended an event associated with the images;

selecting the images associated with the notification based on one or more predefined selection criteria, wherein the predefined selection criteria include image quality and a first relevancy of the images to the target user based on the object recognition and the target user attending the event associated with the images, wherein the selecting the images comprises:

obtaining the images;

ranking the images based on the one or more predefined selection criteria; and selecting the images based on the ranking;

cropping one or more of the selected images based on one or more predefined cropping criteria including the identification of the face corresponding to the target user and the landmark, wherein the cropping includes cropping a first image from the selected images into a first cropped image of the face and cropping a second image from the selected images into a second cropped image of the landmark;

combining the first cropped image and the second cropped image into a combined image; and causing the combined image to be displayed with the notification and a visual indication that the combined image is associated with one or more actions, wherein the one or more actions include that the combined image was commented on.

16. The computer-readable medium of claim 15, wherein the predefined selection criteria include a second relevancy of each image to the target user based on at least one of the target user being in each image, each image being associated with the event, the target user being an invitee to the event, and the target user being an attendee to the event.

17. The computer-readable medium of claim 15, wherein the predefined selection criteria further include a determination that the target user is in one or more of the images.

18. The computer-readable medium of claim 15, wherein the predefined selection criteria further include a determination that the target user is tagged in one or more of the images.

19. The computer-readable medium of claim 15, wherein the one or more predefined selection criteria further includes space allotment.

20. The computer-readable medium of claim 15, wherein, selecting the images comprises selecting the images and:

obtaining the images;

ranking the images based on the one or more predefined selection criteria, wherein the predefined selection criteria further include social affinity criteria; and selecting the images based on the ranking.

* * * * *